(12) United States Patent
Choudhary et al.

(10) Patent No.: US 7,636,919 B2
(45) Date of Patent: Dec. 22, 2009

(54) USER-CENTRIC POLICY CREATION AND ENFORCEMENT TO MANAGE VISUALLY NOTIFIED STATE CHANGES OF DISPARATE APPLICATIONS

(75) Inventors: Samar Choudhary, Morrisville, NC (US); John R. Hind, Raleigh, NC (US); Naveenkumar V. Muguda, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 10/663,952

(22) Filed: Sep. 16, 2003

(65) Prior Publication Data

US 2005/0060721 A1    Mar. 17, 2005

(51) Int. Cl.
   G06F 3/00    (2006.01)
   G06F 9/44    (2006.01)
   G06F 9/46    (2006.01)
   G06F 13/00   (2006.01)

(52) U.S. Cl. ................................................. 719/318
(58) Field of Classification Search ................ 719/318
   See application file for complete search history.

(56) References Cited

U.S. PATENT DOCUMENTS

| | | | | |
|---|---|---|---|---|
| 5,063,523 A | * | 11/1991 | Vrenjak | 709/223 |
| 5,621,663 A | * | 4/1997 | Skagerling | 702/186 |
| 5,691,917 A | * | 11/1997 | Harrison | 717/127 |
| 5,787,409 A | * | 7/1998 | Seiffert et al. | 706/45 |
| 5,815,702 A | * | 9/1998 | Kannan et al. | 712/244 |
| 5,872,931 A | * | 2/1999 | Chivaluri | 709/223 |
| 5,944,782 A | * | 8/1999 | Noble et al. | 709/202 |
| 6,035,343 A | * | 3/2000 | Tsushima et al. | 719/318 |
| 6,208,345 B1 | * | 3/2001 | Sheard et al. | 715/853 |
| 6,226,693 B1 | * | 5/2001 | Chow et al. | 719/318 |
| 6,336,139 B1 | * | 1/2002 | Feridun et al. | 709/224 |
| 6,347,374 B1 | * | 2/2002 | Drake et al. | 726/1 |

(Continued)

OTHER PUBLICATIONS

Rosenblum, D. S. and Wolf, A. L.,"A design framework for Internet-scale event observation and notification", Sep. 22-25, 1997, Springer-Verlag New York, In Proceedings of the 6th European Conference Held Jointly with the 5th ACM SIGSOFT international Symposium on Foundations of Software Engineering.*

(Continued)

Primary Examiner—Hyung S Sough
Assistant Examiner—KimbleAnn Verdi
(74) Attorney, Agent, or Firm—Andre Gibbs, Esq.; Steven M. Greenberg, Esq.; Carey, Rodriguez, Greenberg & Paul, LLP

(57) ABSTRACT

A user centric policy creation and enforcement system, method and apparatus. The method can include observing state changes and action invocations in disparate applications through visual views of the applications. Correlations can be established between the observed state changes and action invocations. Rules can be formulated in a policy based upon user selected ones of the established correlations. Each of the rules can specify a state change in at least one of the applications. Each of the rules further can specify at least one resulting action invocation in at least one other of the applications. Finally, the policy can be applied so as to automatically respond to each subsequently observed state change with a specified action invocation.

14 Claims, 3 Drawing Sheets

U.S. PATENT DOCUMENTS

| | | | |
|---|---|---|---|
| 6,366,926 B1* | 4/2002 | Pohlmann et al. | 707/104.1 |
| 6,385,724 B1* | 5/2002 | Beckman et al. | 713/167 |
| 6,446,136 B1* | 9/2002 | Pohlmann et al. | 719/318 |
| 6,721,804 B1* | 4/2004 | Rubin et al. | 709/246 |
| 6,766,368 B1* | 7/2004 | Jakobson et al. | 709/224 |
| 6,779,120 B1* | 8/2004 | Valente et al. | 726/1 |
| 6,965,900 B2* | 11/2005 | Srinivasa et al. | 707/102 |
| 7,269,625 B1* | 9/2007 | Willhide et al. | 709/206 |
| 7,305,679 B2* | 12/2007 | Kovacs et al. | 719/313 |
| 7,461,382 B2* | 12/2008 | Hammerich et al. | 719/318 |
| 2002/0052980 A1* | 5/2002 | Sanghvi et al. | 709/318 |
| 2002/0073195 A1* | 6/2002 | Hellerstein et al. | 709/224 |
| 2002/0083168 A1* | 6/2002 | Sweeney et al. | 709/224 |
| 2002/0091753 A1* | 7/2002 | Reddy et al. | 709/202 |
| 2002/0165842 A1* | 11/2002 | Hellerstein et al. | 706/47 |
| 2002/0169842 A1* | 11/2002 | Christensen et al. | 709/206 |
| 2003/0074440 A1* | 4/2003 | Grabarnik et al. | 709/224 |
| 2004/0010793 A1* | 1/2004 | Wallace et al. | 719/318 |
| 2004/0064293 A1* | 4/2004 | Hamilton et al. | 702/182 |
| 2004/0078734 A1* | 4/2004 | Deuter | 714/57 |
| 2004/0104947 A1* | 6/2004 | Schmitt | 345/859 |
| 2004/0139452 A1* | 7/2004 | Hope et al. | 719/318 |
| 2005/0027837 A1* | 2/2005 | Roese et al. | 709/223 |
| 2006/0059107 A1* | 3/2006 | Elmore et al. | 705/64 |

OTHER PUBLICATIONS

Wege, C., "Portal server technology", May/Jun. 2002, IEEE Internet Computing, vol. 6, Iss.3, pp. 73-77.*

"Event Relationship Networks: A Framework for Action Oriented Analysis in Vent Management", *IBM Research Report*, RC 28143 ((98313) Sep. 28, 2000.

"*Managing Networks the Easy Way*", <<www.informationweek.com/719/inno4.htm>>.

"*A Comprehensive Operations Management Solution from NetIQ and Microsoft*", White Paper; Microsoft, NetIQ.

* cited by examiner

USER-CENTRIC POLICY CREATION AND ENFORCEMENT TO MANAGE VISUALLY NOTIFIED STATE CHANGES OF DISPARATE APPLICATIONS

BACKGROUND OF THE INVENTION

1. Statement of the Technical Field

The present invention relates to the field of event management and more particularly to managing application state changes among disparate applications.

2. Description of the Related Art

Conventional disparate applications operate autonomously without regard to the operation of other applications coexisting in the same computing network. Consequently, where state changes within one application affect the operation of other applications, an artificial adaptation between the applications must be created to address such state changes. In the context of event relationship networks and network and enterprise management tools, adapters have been developed to capture event occurrences in one disparate application for use in acting upon a second disparate application.

Within event relationship networks, event management consoles have become commonplace through which events detected in one application can be acted upon in other, disparate applications. Typically, once captured through a parsing of log files for an application, an event can be processed in the event management console which can alert a systems administrator to the occurrence of the event. Based upon an evaluation of the event, an administrator can physically effectuate an action within one or more disparate applications in response to the event. Nevertheless, to effectively capture every event of relevance, an adapter must be written requiring substantial computer software development resources.

A framework for adapting network device events to other disparate devices previously had been proposed in the seminal paper, David Thoenen, Jim Riosa and Joseph L. Hellerstein, Event Relationship Networks: *A Framework for Action Oriented Analysis in Event Management*, in IFIP/IEEE International Symposium on Integrated Network Management (Sep. 28, 2000)(hereinafter "Framework"). The Framework teaches an action oriented analysis in which the sources of events are identified and the identified events are inventoried to determine their meaning in the context in which the events were generated. Roles are assigned to the events depending upon the context and correlation rules are developed that both identify event roles and also initiate appropriate device actions responsive to the events.

Notably, while the Framework had been proposed primarily in respect to the management of network device events, the principal of the Framework—the generation of correlation rules for initiating appropriate actions in response to identifiable events—can have broad application. Nevertheless, the Framework lacks implementation details sufficient to enable any such broad application. In particular, the Framework does not address the specific problem of events arising among interdependent but de-coupled and disparate applications.

Presently, many commercial network management product offerings utilize advanced portal and portlet technology for providing a presentation layer to network management logic. As an example, the IBM Integrated Solutions Console™ is a portal based user interface included as a supporting component of the Tivoli Management Portal™ manufactured by the International Business Machines Corporation of Armonk, N.Y., United States. Within the portal, different panes in a single window can provide for simple tree navigation between work pages, an event viewer, a portfolio portlet which allows administrators to launch new applications within the work page, and a resource health model.

Notably, within the portal view, different portlet views can be assigned to different disparate applications. Through a corresponding portlet, an application can be centrally managed, just as in the case of remotely disposed devices in a conventional network management tool. Nevertheless, to coordinate a response to an event arising in a given application viewed through the portal, a mixture of manual and programmatic actions will be required. First, an adapter must be developed to identify and present the occurrence of an event in one application through the portal. Subsequently, an administrator must manually intervene to effectuate a corresponding action in the disparate application.

SUMMARY OF THE INVENTION

The present invention addresses the deficiencies of the art in respect to network and enterprise management of disparate applications and provides a novel and non-obvious method, system and apparatus for generating and enforcing user centric management policies for acting upon events detected in a disparate application. Methods consistent with the present invention provide a user centric policy creation and enforcement method in which state changes and action invocations can be observed in disparate applications through visual views of the applications.

Correlations can be established between the observed state changes and action invocations. Rules can be formulated in a policy based upon user selected ones of the established correlations. Each of the rules can specify a state change in at least one of the applications. Each of the rules further can specify at least one resulting action invocation in at least one other of the applications. Finally, the policy can be applied so as to automatically respond to each subsequently observed state change with a specified action invocation.

Systems consistent with the present invention, by comparison, can include a user centric policy creation and enforcement system. The user centric policy creation and enforcement system can include a policy interface unit coupled to a multiplicity of user interface views into corresponding disparate applications. The policy interface unit can be configured to establish a policy to respond to observed state changes in selected ones of the applications with action invocations in others of the applications. The policy interface unit also can be configured to enforce the established policy by applying the action invocations responsive to observing the state changes.

Importantly, the user interface views can include portlet views. Additionally, the policy interface unit can be disposed within an integrated solutions console. The policy interface unit itself can include a learning component, a user dialog component and an enforcement component. The learning component can have a configuration for correlating observed events with action invocations to formulate proposed rules. The user dialog component can have a configuration for accepting a user selection of the proposed rules. Finally, the enforcement component can have a configuration for enforcing selected ones of the proposed rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for creating and applying user centric policies for responding and acting upon events detected in disparate applications. The present invention can be incorporated in a portal view of a network or enterprise management console such that individual portlet views of disparate applications can provide a visual indication of the state of the application presented therein. Upon detecting an event in an application through the portlet view of the application, the end user response to the visual indication can be monitored including the effectuation of an action in one or more other applications in the portal view. Based upon the end user response to the visual indication, a policy can be generated for automatically handling subsequent occurrences of the event.

Figure 1:
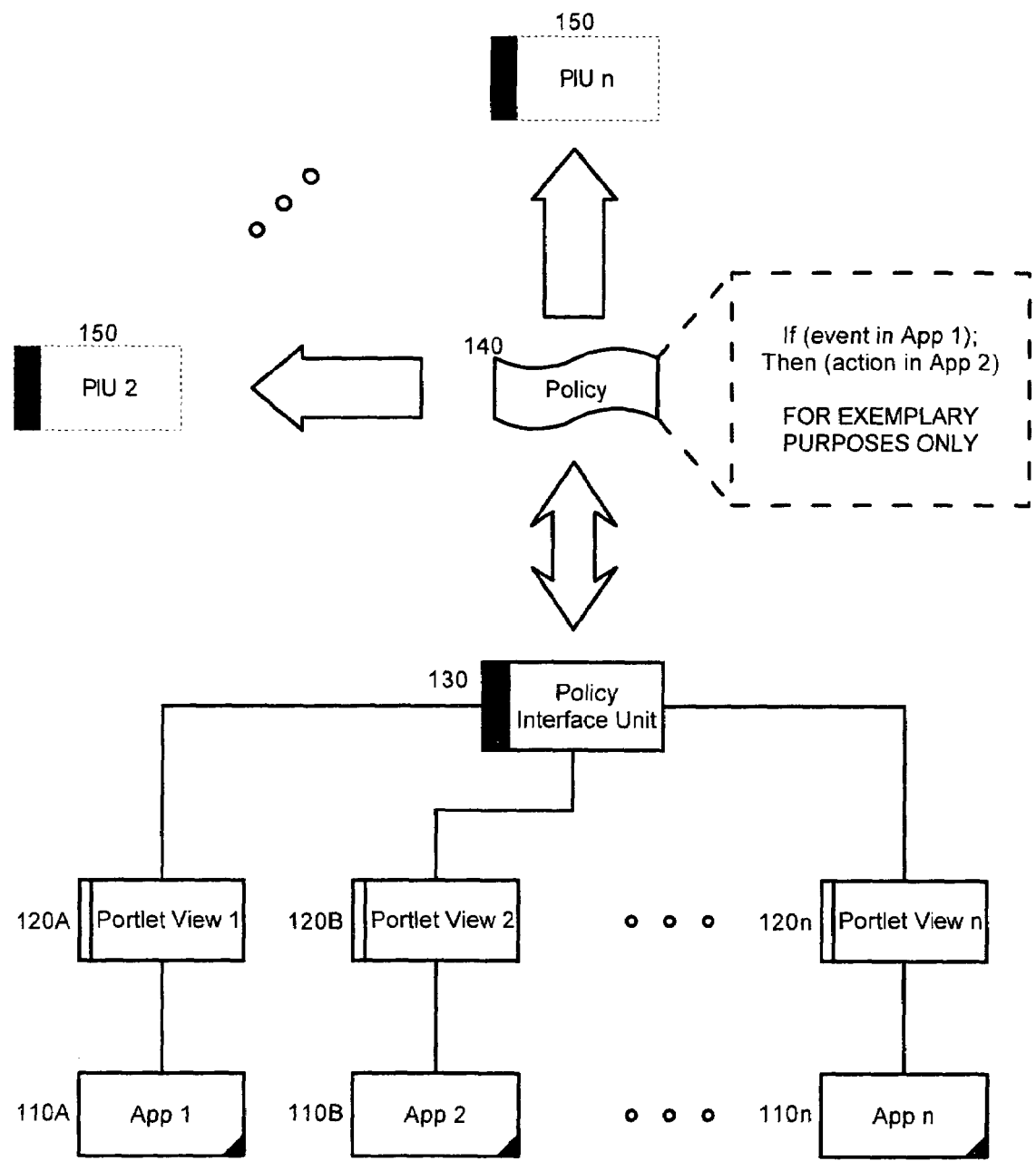
FIG. 1 is a schematic illustration of a system for generating a policy for managing state changes among disparate applications.

FIG. 1 is a schematic illustration of a system for generating a policy for managing state changes among disparate applications. The system can include a set of disparate applications 110A, 110B, 110n such as document editors, Web application servers, database servers, and utility applications such as virus scanning software. The operation of the applications 110A, 110B, 100n can be monitored and managed in a visual portal view consisting of a multiplicity of portlet views 120A, 120B, 120n. Each portlet view 120A, 120B, 120n can be communicatively coupled to a corresponding one of the applications 110A, 110B, 110n.

Importantly, a policy interface unit 130 can be provided which can process patterns (not shown) to be found in content rendered by the portlet views 120A, 120B, 120n. More specifically, the policy interface unit 130 can maintain a set of patterns each abstracting a portion of the content within the portlet views 120A, 120B, 120n. The abstraction can relate to one or more possible state changes within the application 110A, 110B, 110n corresponding to the portlet views 120A, 120B, 120n. In this regard, individual state changes within any one of the applications 110A, 110B, 110n can be visually reflected in markup defining corresponding ones of the portlet views 120A, 120B, 120n. Thus, an abstraction can be defined for that portion of the portlet views 120A, 120B, 120n which may reflect a state change in a corresponding one of the applications 110A, 110B, 110n. Notably, the pattern is not limited strictly to the an abstraction of content and also can include a periodic event such as a clock event.

Each abstraction identified by the policy interface unit 130 can be associated with one or more desired actions to be performed in one or more other ones of the applications 110A, 110B, 110n. The associations, in turn, can be represented in policy markup 140 as shown in FIG. 1. The policy markup 140 principally can represent preferred actions to be performed in the applications 110A, 110B, 110n responsive to the occurrence of an event detected in one of the applications 110A, 110B, 110n as specified by one or more of the patterns. Each of these associations preferably can be specified as a rule which can be processed within a rules engine. Moreover, each end-user action within any one of the portlet views 120A, 120B, 120n can be abstracted by way of a pattern.

Initially, the rules within the policy 140 can be defined by observing state changes within one of the applications 110A, 110B, 110n and an administrative response to the observed state changes in others of the applications 110A, 110B, 110n. The state changes themselves can be observed through the portlet views 120A, 120B, 120n as can the administrative responses. In this regard, the rules within the policy can be formulated much in the same way as a macro can be defined in a document processor.

Once a set of rules have been defined within the policy 140, the patterns (not shown) can be matched to occurring state changes specified by the content of the applications 110A, 110B, 110n. Depending upon the rules corresponding to the matched state changes, the pre-defined actions can be performed in the other applications 110A, 110B, 110n as specified within the policy 140. Importantly, the pre-defined actions can be performed, in the other applications 110A, 110B, 110n even though the state change had been observed within a disparate application.

The advantages of the framework illustrated within FIG. 1 include the reuse of the policy 140 in the context of other policy interface units 150 monitoring the views of other disparate applications in other systems. For instance, where an administrator of a set of applications can define an exportable policy for responding to state changes within an application, the policy can be imported into other systems where the relevant portion of the policy can be applied. Additionally, access control can be associated with a policy to limit the applicability of the policy to those administrators having similar or equivalent access rights.

Figure 2:
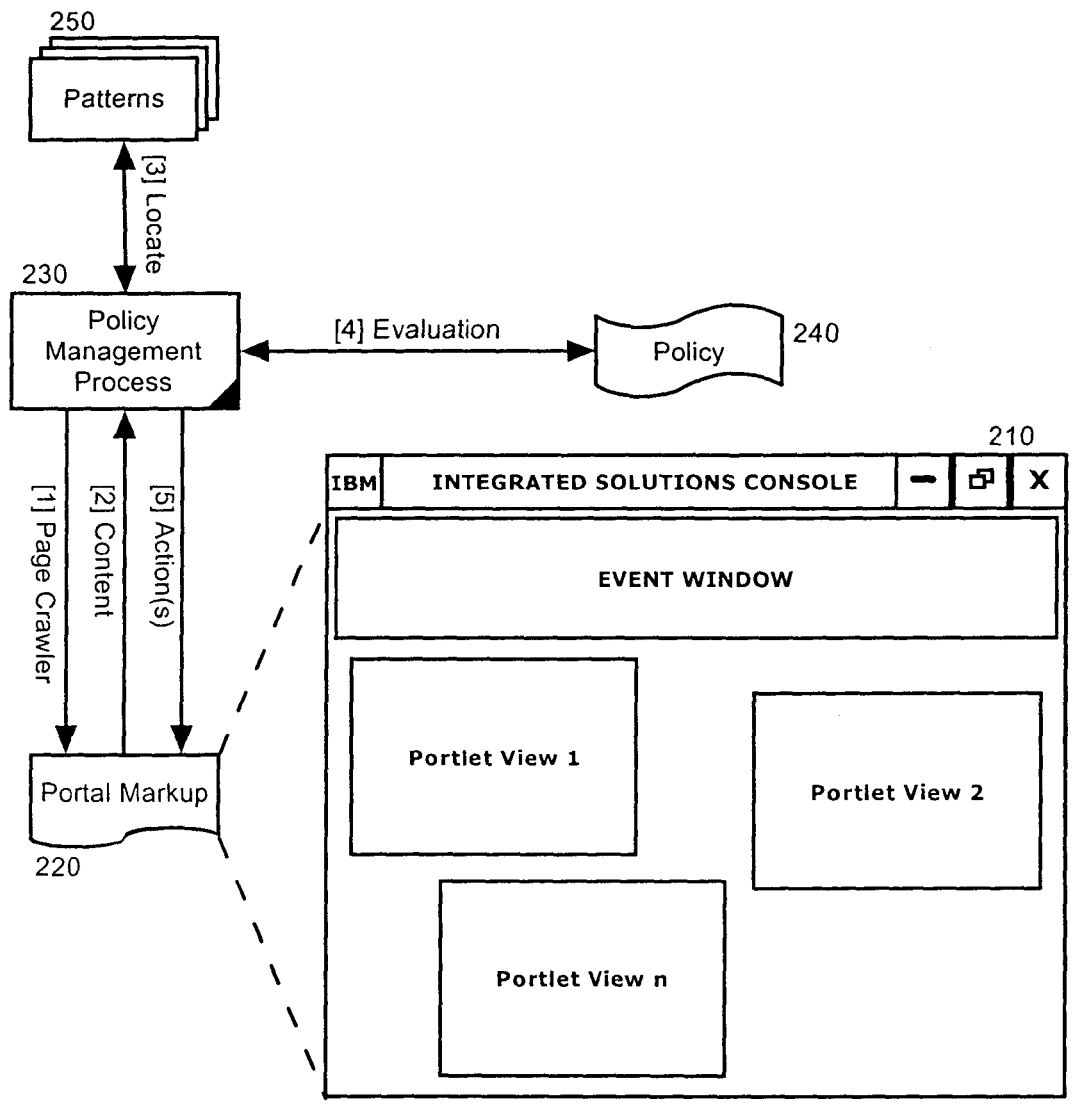
FIG. 2 is a pictorial illustration of an integrated solutions console configured to apply a user centric policy to manage events within disparate applications visually presented within the console; and, FIG. 3 is a block diagram illustrating a process for establishing the user centric policy of FIG. 1 and for managing events in accordance with the user centric policy of FIG. 1.

Importantly, the framework illustrated within FIG. 1 can be applied within an integrated solutions console through which a unified set of portlet views of disparate applications can be presented. In this regard, FIG. 2 is a pictorial illustration of an integrated solutions console 210 configured to apply a user centric policy to manage events within disparate applications visually presented within the console 210. Initially, a policy management process 230 can parse the portal markup 220 forming the view of the console 210 to demarcate portions of the markup 220 forming the different portlet views. To assist in this function, a page crawler can be applied to the portal markup 220.

Through this demarcation process, a list of portlet views within the console 210 can be obtained by the policy management process 230 which can be used to identify patterns 250 for inclusion in the policy 240 (the "record" phase), and also to apply the policy 240 to state changes observed within individual ones of the portlet views incorporated in the console 210 (the "manage" phase). In the "record" phase, the portlet view can be converted to a uniform markup language representation such as XML and presented to the administrator. The administrator can select the portion of the markup evidencing the state change in the underlying application. The selected portion can form the basis of a pattern 250 which indicates the occurrence of the state change.

Subsequently, the administrator can specify one or more actions to be performed in one or more other portlet views in response to the detection of a state change regardless of the detection of the state change in any particular underlying application. The actions can be specified in terms of action invokers such as by specifying the selection of a submit button or one or more parameter fields, as well as the selection of radio buttons and the population of text fields within one or more portlet views of other applications monitored through the console 210. The action to be performed in response to the state change can form the basis of a "rule" for inclusion in the policy 240.

Within the policy 240 itself, the rule can be treated as a collection of {portlet-name, parameter-name, parameter-value} tuples. Each tuple can be constructed manually, or automatically through a graphical dialog box in which the administrator can select the pattern and the actions. In either case, a markup language representation of the rule can specify a pattern to be detected and an action to be undertaken upon detecting the pattern. Importantly, the pattern to be detected can specify a portlet in which the pattern is to be detected, and the action to be undertaken can specify the portlet in which the action is to be undertaken—even though the applications are disparate in nature.

For example, a markup language representation of a rule can take the following exemplary form:

```
<rule>
<if>
<event>eventA</event>
<then>
<action>
<name>actionB</name>
<param-name>paramB</param-name>
<param-value>
<event>eventA</event>
<param-name>paramA</param-name>
</param-value>
</action>
</then>
</rule>
```

As it will be recognized by the skilled artisan, in the foregoing example, when the event "eventA" appears in the demarcated portion of the content in the portlet view of an application, a state change is presumed to have occurred and the action "actionB" will be applied using the parameter "paramA". Notably, the action can be performed either in the same application in which the triggering event arose, or in other disparate applications. For instance, where the eventA is detected in a virus scanning application in which a virus has been detected in the file specified by paramA, the actionB can be the unsharing of the file specified by paramA in a file sharing application.

Figure 3:
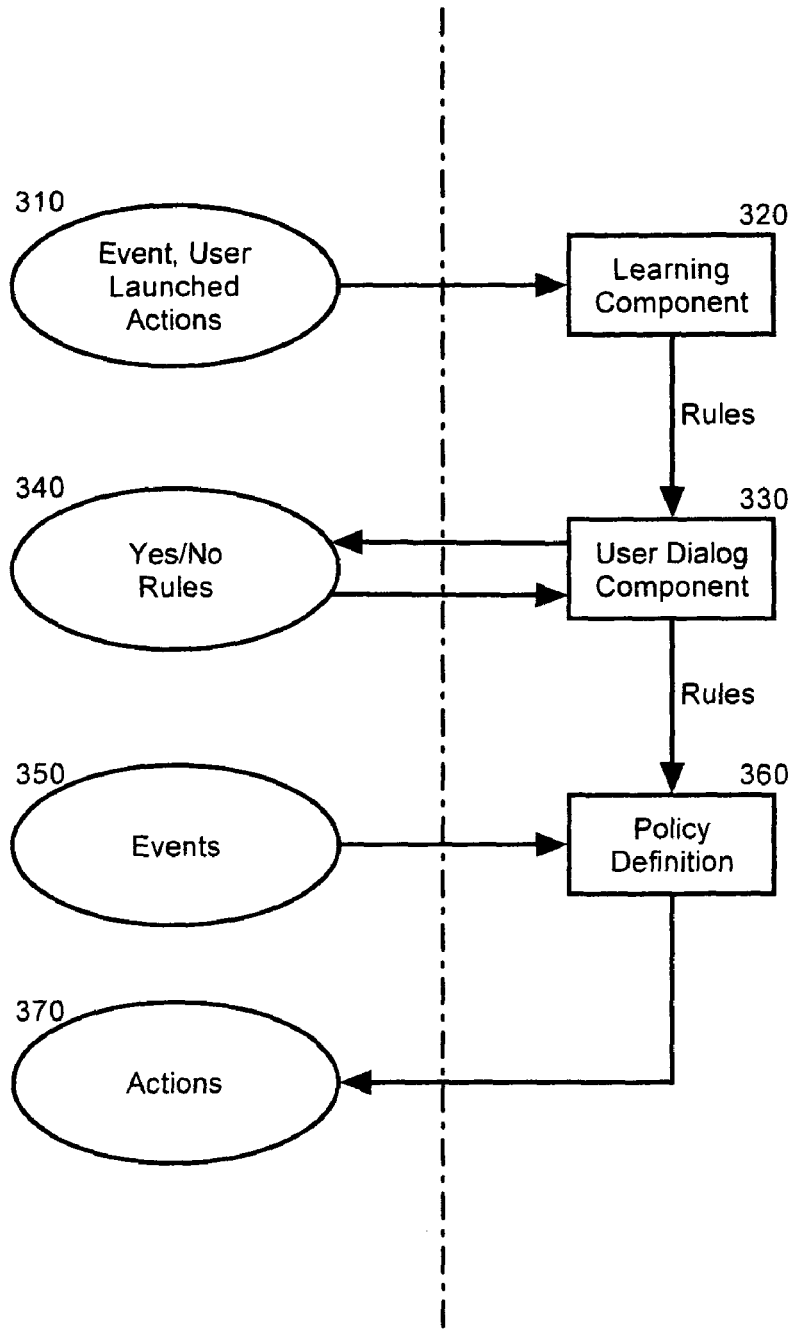

The process of generating and enforcing a user centric policy in accordance with the present invention can be more particularly illustrated by way of a block diagram. To that end, FIG. 3 is a block diagram illustrating a process for establishing the user centric policy of FIG. 1 and for managing events in accordance with the user centric policy of FIG. 1. Beginning in block 310, events can occur in the portlet views of disparate applications monitored in the event management system. Responsive to the events, an administrator can under-take one or more actions, within one or more of the disparate applications monitored in the event management system.

Both the events and the actions can be processed in the learning component 320 to generate proposed rules for consideration by the administrator in formulating the rules of the policy. Specifically, the learning component 320 can establish correlations between events and actions, for instance by comparing the time of occurrence or notification for each event and the time of invoking the resulting action. The resulting correlations can be formulated into proposed rules using known learning methods such as the decision tree learning method. Examples can include:

| Rule | Description |
| --- | --- |
| E1 => A1 | e.g. (if E1 then A1) |
| E2 v E3 => A2 | e.g. (if E2 or E3 then A2) |
| E4 ˆ E5 => A3 | e.g. (if E4 and E5 then A3) |

It will be recognized by the skilled artisan, however, that the foregoing does not represent the exclusive manner in which a rule can be learned. Rather, other learning algorithms can suffice, for instance induced hypothesis.

A user dialog component 330 can present the proposed rules to the administrator in the form of "Yes/No" propositions 340. By Yes/No, it is meant that the user can accept or reject a proposed rule. Where the user has accepted selected ones of the proposed rules, the selected rules can form the basis of the rules within the policy definition 360 while the unselected ones of the proposed rules can be discarded. Once the policy definition 360 has been formulated, events 350 can arise whose visual representation in the event management system can be compared to patterns in the policy definition 360. Where a match occurs and a rule can be satisfied in the policy definition 360, the corresponding action or actions in the rule can be applied.

As an example of an application of the foregoing process, consider the management of two disparate applications monitored within an integrated solutions console: a virus scanning application and a file sharing application. Clearly, where a file managed within the file sharing application has been tagged as virally infected by the virus scanning application, it would be preferable not to share the infected file. Yet, in the conventional arrangement, the file sharing application would remain oblivious to the detection of the virus in the shared file as the two applications are disparate in nature and are not communicatively coupled.

In the integrated solutions console, however, the policy portlet can be inserted into the portlet views of each application. At the outset, the learning component of the policy portlet can identify the visual notification of the virus detection and the policy portlet can detect the visual de-selection of a file from shared mode in the file sharing application. Correlating the visual notification with the visual de-selection, a rule can be proposed which, if accepted by the administrator, can specify that when a virus is detected in a file shared within the file sharing application, the shared file can be deselected within the file sharing application.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A user centric policy creation and enforcement method comprising:
    observing state changes and action invocations in disparate applications through visual views of said disparate applications displayed by a computer system;
    demarcating segments of markup as segments which visually indicate said observed state changes in said disparate applications by parsing said markup defining the visual views of said disparate applications using a page crawler;
    establishing correlations between said observed state changes and action invocations;
    formulating rules in a policy based upon user selected ones of said established correlations, each of said rules specifying a state change in at least one of said disparate applications, and at least one resulting action invocation in at least one other of said disparate applications; and
    applying said policy to automatically respond to each subsequently observed state change with a specified action invocation.

2. The method of claim 1, wherein said establishing correlations comprises:
    noting a time for each of said observed state changes;
    further noting a time for each of said action invocations; and
    correlating said observed state changes with said action invocations based upon said noted times.

3. A user centric policy creation and enforcement system comprising:
    a policy interface unit of a computer system coupled to a plurality of user interface views into corresponding disparate applications,
    said policy interface unit having a configuration for;
    establishing a policy to respond to observed state changes in selected ones of said disparate applications with observed action invocations in others of said disparate applications;
    demarcating segments of markup as segments which visually indicate said observed state changes in said disparate applications by parsing said markup defining the visual views of said disparate applications using a page crawler; and
    enforcing said established policy by applying said action invocations responsive to observing said state changes;
    wherein said policy interface unit comprises a learning component, said learning component having a configuration for correlating observed events with action invocations to formulate proposed rules.

4. The system of claim 3, wherein said plurality of user interface views comprise portlet views.

5. The system of claim 3, wherein said policy interface unit is disposed within an integrated solutions console.

6. The system of claim 3, wherein said policy interface unit further comprises a user dialog component and an enforcement component, said user dialog component having a configuration for accepting a user selection of said proposed rules, said enforcement component having a configuration for enforcing selected ones of said proposed rules.

7. A computer program product comprising a machine readable storage having stored thereon a computer program for user centric policy creation and enforcement, said computer program, when executed by a processor, performing the steps of:
    observing state changes and action invocations in disparate applications through visual views of said disparate applications;
    demarcating segments of markup as segments which visually indicate said observed state changes in said disparate applications by parsing said markup defining the visual views of said disparate applications using a page crawler;
    establishing correlations between said observed state changes and action invocations;
    formulating rules in a policy based upon user selected ones of said established correlations, each of said rules specifying a state change in at least one of said disparate applications, and at least one resulting action invocation in at least one other of said disparate applications; and
    applying said policy to automatically respond to each subsequently observed state change with a specified action invocation.

8. The computer program product of claim 7, wherein said establishing correlations comprises the steps of:
    noting a time for each of said observed state changes;
    further noting a time for each of said action invocations; and
    correlating said observed state changes with said action invocations based upon said noted times.

9. A method for user centric policy creation and enforcement comprising:
    observing in an initial policy interface unit state changes and action invocations in at least one application through a visual view of said at least one application displayed by a computer system;
    demarcating segments of markup as segments which visually indicate said observed state changes in said disparate applications by parsing said markup defining the visual views of said disparate applications using a page crawler;
    establishing correlations between said observed state changes and action invocations;
    formulating rules in a policy based upon user selected ones of said established correlations, each of said rules specifying a state change in said at least one application, and at least one resulting action invocation in one of said at least one application and at least one other application; and
    distributing said policy to at least one other policy interface unit; and enforcing said policy in said at least one other policy interface unit to automatically respond to each subsequently observed state chance with a specified action invocation.

10. The method of claim 9, further comprising enforcing said policy in said at least one other policy interface unit to automatically respond to each subsequently observed state change with a specified action invocation.

11. The method of claim 10, further comprising limiting said enforcing of said policy in said at least one other policy interface unit based upon pre-defined permissions.

12. A computer program product comprising a machine readable storage having stored thereon a computer program for user centric policy creation and enforcement, the computer program, when executed by a processor, performing the steps of:

observing in an initial policy interface unit state changes and action invocations in at least one application through a visual view of said at least one application;

demarcating segments of markup as segments which visually indicate said observed state changes in said disparate applications by parsing said markup defining the visual views of said disparate applications using a page crawler;

establishing correlations between said observed state changes and action invocations;

formulating rules in a policy based upon user selected ones of said established correlations, each of said rules specifying a state change in said at least one application, and at least one resulting action invocation in one of said at least one application and at least one other application; and distributing said policy to at least one other policy interface unit; and enforcing said policy in said initial policy interface unit to automatically respond to each subsequently observed state change with a specified action invocation.

13. The computer program product of claim 12, further comprising the step of enforcing said policy in said at least one other policy interface unit to automatically respond to each subsequently observed state change with a specified action invocation.

14. The computer program product of claim 13, further comprising the step of limiting said enforcing of said policy in said at least one other policy interface unit based upon pre-defined permissions.

* * * * *

UNITED STATES PATENT AND TRADEMARK OFFICE
CERTIFICATE OF CORRECTION

PATENT NO.        : 7,636,919 B2                                    Page 1 of 1
APPLICATION NO.   : 10/663952
DATED             : December 22, 2009
INVENTOR(S)       : Choudhary et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1860 days.

Signed and Sealed this

Ninth Day of November, 2010

David J. Kappos
*Director of the United States Patent and Trademark Office*